(12) United States Patent
Wang

(10) Patent No.: US 11,029,482 B2
(45) Date of Patent: Jun. 8, 2021

(54) PRESSING RING AND LENS MODULE

(71) Applicant: AAC Technologies Pte. Ltd., Singapore (SG)

(72) Inventor: Hailong Wang, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 190 days.

(21) Appl. No.: 16/525,605

(22) Filed: Jul. 30, 2019

(65) Prior Publication Data

US 2020/0041753 A1 Feb. 6, 2020

(30) Foreign Application Priority Data

Aug. 4, 2018 (CN) .......................... 201821261946.3

(51) Int. Cl.
*G02B 7/02* (2021.01)
(52) U.S. Cl.
CPC .................................. *G02B 7/026* (2013.01)
(58) Field of Classification Search
CPC .......... G02B 7/026; G02B 7/025; G02B 7/02; G02B 7/00
USPC ................................................. 359/830, 819
See application file for complete search history.

(56) References Cited

U.S. PATENT DOCUMENTS

| | | | | |
|---|---|---|---|---|
| 7,929,223 B2* | 4/2011 | Shimizu | ................. | G02B 7/026 359/811 |
| 8,259,403 B2* | 9/2012 | Kuwahara | .............. | G02B 27/62 359/823 |
| 9,568,808 B2* | 2/2017 | Pizzo | ..................... | G02B 7/026 |
| 10,288,095 B2* | 5/2019 | Lamontagne | ......... | F16B 43/004 |
| 2005/0122600 A1* | 6/2005 | Yoshizawa | ............. | G02B 7/025 359/819 |
| 2007/0047110 A1* | 3/2007 | Matsushima | .......... | G02B 7/023 359/819 |
| 2007/0076309 A1* | 4/2007 | Shimizu | ................. | G02B 7/026 359/811 |
| 2011/0199695 A1* | 8/2011 | Kuwahara | .............. | G02B 7/026 359/823 |
| 2016/0041453 A1* | 2/2016 | Pizzo | ..................... | G02B 7/026 396/530 |
| 2016/0084281 A1* | 3/2016 | Lamontagne | ......... | F16B 43/004 248/314 |
| 2016/0178805 A1* | 6/2016 | Kang | ..................... | G02B 7/022 359/614 |
| 2018/0149778 A1* | 5/2018 | Kang | ................. | G02B 27/0018 |
| 2020/0041754 A1* | 2/2020 | Wang | ..................... | G02B 7/026 |

* cited by examiner

*Primary Examiner* — William R Alexander
(74) *Attorney, Agent, or Firm* — W&G Law Group LLP

(57) ABSTRACT

The present disclosure provides a pressing ring and a lens module. The pressing ring includes an annular body; and first and second sheared edges formed on the annular body. The body includes an inner side wall around an optical axis and forming a light through hole, an object-side wall extending from an edge of the inner side wall in a direction facing away from optical axis, an image-side wall opposite to the object-side wall and extending from an edge of the inner side wall in a direction facing away from the optical axis, and an outer side wall extending from an edge of the object-side wall facing away from the inner side wall to the image-side wall. The object-side wall includes an abutting surface surrounding the inner side wall and connected to the inner side wall, and a glue-dispensing groove surrounding and connected to the abutting surface.

8 Claims, 2 Drawing Sheets

PRESSING RING AND LENS MODULE

TECHNICAL FIELD

The present disclosure relates to the field of optical imaging technologies, and in particular, to a pressing ring and a lens module.

BACKGROUND

With the continuous development of technology, electronic devices become more and more intelligent. In addition to digital cameras, portable electronic devices such as tablet PC and mobile phones are also equipped with lens modules having a photographing function in order to meet the users' requirements to take photos at any time. In the related art, a lens module includes a lens barrel, a plurality of lenses provided in the lens barrel, a light shading piece or a light shading plate sandwiched between two adjacent lenses, and a pressing ring provided at an image side of the lens. An abutting wall of the pressing ring is abutted against the lens. The pressing ring is fixed to the lens barrel by glue-dispensing, thereby achieving fixation of the lens.

The inventors have found that at least the following problems exist in the related art. During the forming of the pressing ring, vertical burrs may be generated at the abutting wall, so that an abutting surface between the pressing ring and the lens is uneven after the pressing ring is assembled into the lens module. Therefore, a relative displacement may easily occur between the pressing ring and the lens, resulting in a low stability of the lens module. Therefore, it is necessary to provide a new pressing ring and lens module to solve the above problems.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will be further illustrated with reference to the accompanying drawings and the embodiments.

Figure 1:
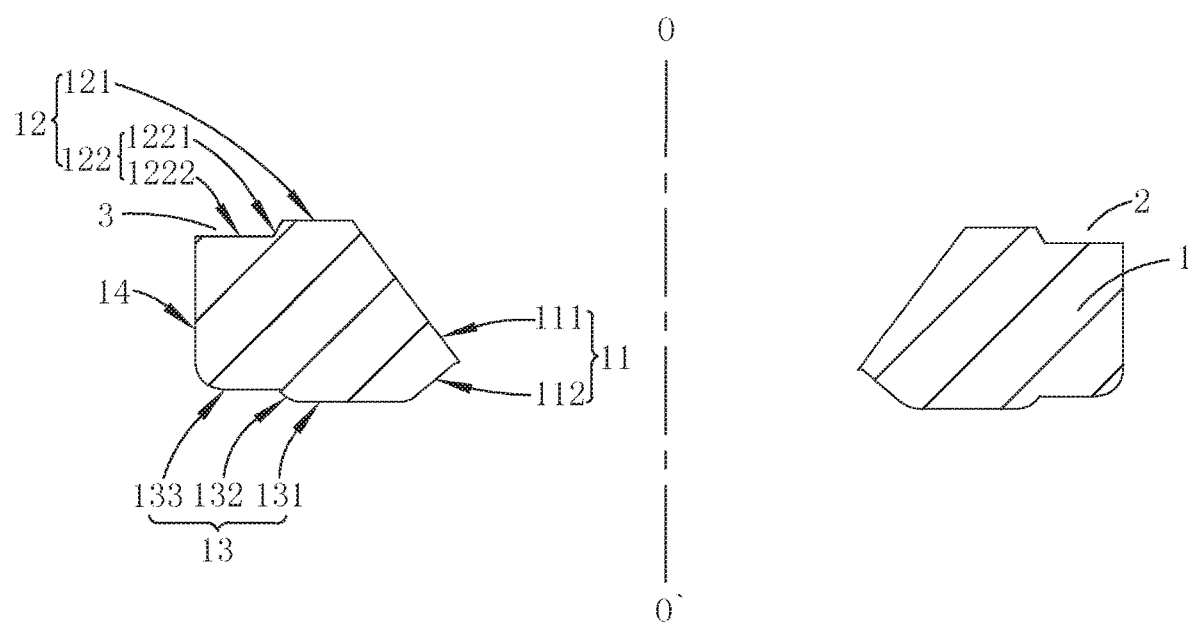
FIG. 1 is a cross-sectional view showing a pressing ring according to a first embodiment of the present disclosure.
Figure 2:
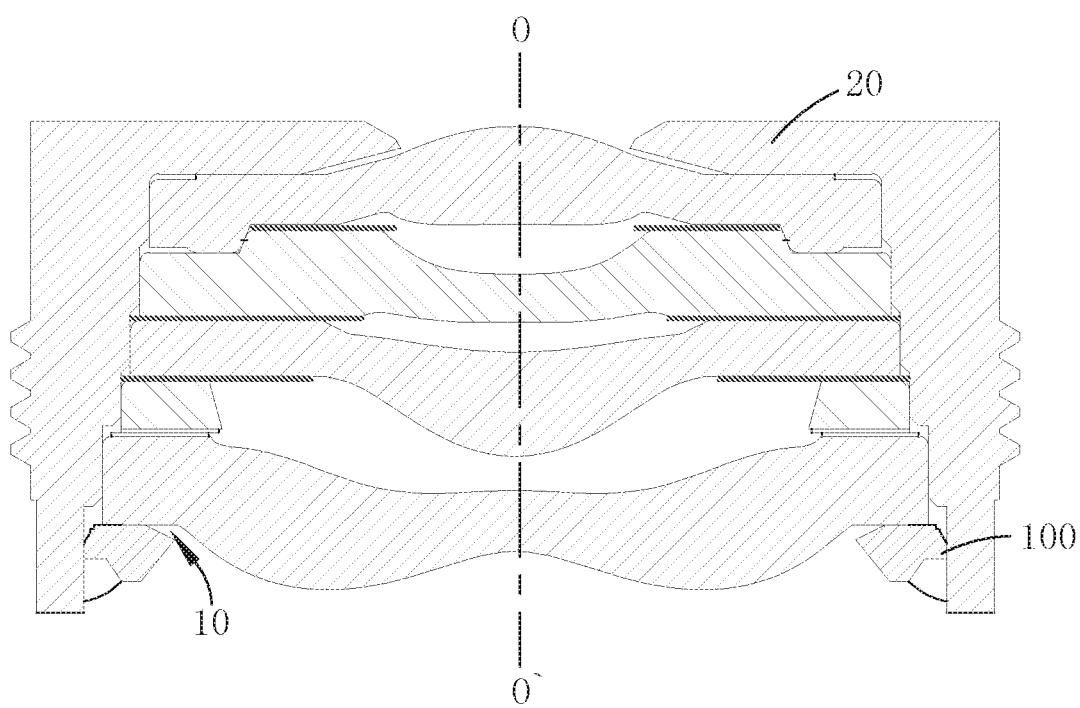
FIG. 2 is a cross-sectional view showing a lens module according to a second embodiment of the present disclosure.

As shown in FIGS. 1 and 2, a first embodiment of the present disclosure provides a pressing ring 100.

The pressing ring 100 includes an annular body 1, a first sheared edge 2 and a second sheared edge 3. The annular body 1 forms a light through hole 10. The first sheared edge 2 and the second sheared edge 3 are formed on the body 1. The body 1 includes an inner side wall 11 around an optical axis OO' and forming the light through hole 10, an object-side wall 12 extending from an edge of the inner side wall 11 close to the object side in a direction facing away from the optical axis OO', an image-side wall 13 opposite to the object-side wall 12 and extending from an edge of the inner side wall 11 close to the image side in a direction facing away from the optical axis OO', and an outer side wall 14 extending from an edge of the object-side wall 12 facing away from the inner side wall 11 to the image-side wall 13. The object-side wall 12 includes an abutting surface 121 and a glue-dispensing groove 122. The abutting surface 121 surrounds the inner side wall 11 and is connected to the inner side wall 11. The glue-dispensing groove 122 surrounds the abutting surface 121 and is connected to the abutting surface 121. Each of the first sheared edge 2 and the second sheared edge 3 is located in the glue-dispensing groove 122.

Compared with the related art, in this embodiment, the object-side wall 12 includes an abutting surface 121 surrounding the inner side wall 11 and connected to the inner side wall 11, a glue-dispensing groove 122 surrounding the abutting surface 121 and connected to the abutting surface 121, each of the first sheared edge 2 and the second sheared edge 3 is located in the glue-dispensing groove 122, and the pressing ring 100 is sheared and cut at a side of the glue-dispensing groove 122, so that the vertical burrs occurring at the abutting surface 121 at which the pressing ring 100 abuts against the lens can be avoided. In this way, the flatness of the abutting surface 121 can be ensured, so that a relative displacement between the pressing ring 100 and the lens due to the uneven abutting surface can be avoided during the movement of the lens module, thereby improving the assembly stability of the lens module.

In one embodiment, the glue-dispensing groove 122 includes a first side surface 1221 extending from an edge of the abutting wall 12 facing away from the optical axis OO' along a direction of the optical axis OO', and a second side surface 1222 extending from an edge of the first side surface 1221 facing away from the abutting wall 12 in a direction facing away from the optical axis OO'. The first sheared edge 2 and the second sheared edge 3 are located at the second side surface 1222. It can be understood that, in this embodiment, acetone can be used to dispense glue in order to melt the pressing ring 100 and the lens together, thereby further improving the stability of the lens module.

It should be noted that the inner side wall 11 includes a first surface 111 and a second surface 112. The first surface 111 extends from an edge of the abutting surface 121 close to the optical axis OO' in a direction facing away from the object side and towards the optical axis OO'. The second surface 112 extends from an edge of the first surface 111 facing away from the abutting surface 121 in a direction facing towards the image side and facing away from the optical axis OO'.

It should be noted that the image-side wall 13 includes a first side wall 131 extending from an edge of the second surface 112 facing away from the optical axis OO' in a direction facing away from the optical axis OO', a second side wall 132 extending from an edge of the first side wall 131 facing away from the optical axis OO' in a direction facing towards the object side and facing away from the optical axis OO', and a third side wall 133 extending from an edge of the second side wall 132 facing away from the first side wall 131 in a direction facing away from the optical axis OO'. The third side wall 133 is connected to the outer side wall 14.

A second embodiment of the present disclosure provides a lens module 200. As shown in FIG. 2, a lens module 200 includes the pressing ring 100 described above, and a lens barrel 20 receiving the pressing ring 100.

The above are only preferred embodiments of the present disclosure. Here, it should be noted that those skilled in the art can make modifications without departing from the inventive concept of the present disclosure, but these shall fall into the protection scope of the present disclosure.

What is claimed is:

1. A pressing ring, comprising:

an annular body forming a light through hole;

a first sheared edge formed on the annular body; and a second sheared edge formed on the annular body, the body comprises an inner side wall around an optical axis and forming the light through hole, an object-side wall extending from an edge of the inner side wall close to an object side in a direction facing away from the optical axis, an image-side wall opposite to the object-side wall and extending from an edge of the inner side wall close to an image side in a direction facing away from the optical axis, and an outer side wall extending from an edge of the object-side wall facing away from the inner side wall to the image-side wall; the object-side wall comprises an abutting surface surrounding the inner side wall and connected to the inner side wall, and a glue-dispensing groove surrounding the abutting surface and connected to the abutting surface; and each of the first sheared edge and the second sheared edge is located in the glue-dispensing groove.

2. The pressing ring as described in claim 1, wherein the glue-dispensing groove comprises a first side surface extending from an edge of the object side wall facing away from the optical axis in a direction facing towards the optical axis, and a second side surface extending from an edge of the first side surface facing away from the object-side wall in a direction facing away from the optical axis; and the first sheared edge and the second sheared edge are located at the second side surface.

3. The pressing ring as described in claim 1, wherein the inner side wall comprises a first surface extending from an edge of the abutting surface close to the optical axis in a direction facing away from the object side and facing towards the optical axis, a second surface extending from an edge of the first surface facing away from the abutting surface in a direction facing towards the image side and facing away from the optical axis.

4. The pressing ring as described in claim 3, wherein the image-side wall comprises a first side wall extending from an edge of the second surface facing away from the optical axis in a direction facing away from the optical axis, a second side wall extending from an edge of the first side wall facing away from the optical axis in a direction facing towards the object side and facing away from the optical axis, and a third side wall extending from an edge of the second side wall facing away from the first side wall in a direction facing away from the optical axis, the third side wall being connected to the outer side wall.

5. A lens module, comprising the pressing ring as described in claim 1.

6. The lens module as described in claim 5, wherein the glue-dispensing groove comprises a first side surface extending from an edge of the object side wall facing away from the optical axis in a direction facing towards the optical axis, and a second side surface extending from an edge of the first side surface facing away from the object-side wall in a direction facing away from the optical axis; and the first sheared edge and the second sheared edge are located at the second side surface.

7. The lens module as described in claim 5, wherein the inner side wall comprises a first surface extending from an edge of the abutting surface close to the optical axis in a direction facing away from the object side and facing towards the optical axis, a second surface extending from an edge of the first surface facing away from the abutting surface in a direction facing towards the image side and facing away from the optical axis.

8. The lens module as described in claim 7, wherein the image-side wall comprises a first side wall extending from an edge of the second surface facing away from the optical axis in a direction facing away from the optical axis, a second side wall extending from an edge of the first side wall facing away from the optical axis in a direction facing towards the object side and facing away from the optical axis, and a third side wall extending from an edge of the second side wall facing away from the first side wall in a direction facing away from the optical axis, the third side wall being connected to the outer side wall.

* * * * *